(12) United States Patent
Nomura et al.

(10) Patent No.: US 11,487,007 B2
(45) Date of Patent: Nov. 1, 2022

(54) OBJECT DETECTION DEVICE (71) Applicant: DENSO CORPORATION, Kariya (JP)

(72) Inventors: Takuya Nomura, Kariya (JP); Shotaro Tanaka, Kariya (JP); Mitsuyasu Matsuura, Nishio (JP)

(73) Assignee: DENSO CORPORATION, Kariya (JP)

( * ) Notice: Subject to any disclaimer, the term of this patent is extended or adjusted under 35 U.S.C. 154(b) by 383 days.

(21) Appl. No.: 16/329,360

(22) PCT Filed: Aug. 24, 2017

(86) PCT No.: PCT/JP2017/030431
§ 371 (c)(1),
(2) Date: Feb. 28, 2019

(87) PCT Pub. No.: WO2018/043306
PCT Pub. Date: Mar. 8, 2018

(65) Prior Publication Data
US 2019/0212443 A1 Jul. 11, 2019

(30) Foreign Application Priority Data
Sep. 2, 2016 (JP) .............. JP2016-172107

(51) Int. Cl.
*G01S 15/931* (2020.01)
*G01S 15/93* (2020.01)
(Continued)

(52) U.S. Cl.
CPC ............ *G01S 15/931* (2013.01); *B60N 2/002* (2013.01); *G01S 7/52004* (2013.01); *G01S 7/56* (2013.01);
(Continued)

(58) Field of Classification Search
CPC ...... G01S 15/931; G01S 7/52004; G01S 7/56; G01S 15/08; G01S 15/93; G01S 2007/52009; B60N 2/002; G08G 1/16
See application file for complete search history.

(56) References Cited

U.S. PATENT DOCUMENTS

| 2011/0241858 A1 | 10/2011 | Tsuzuki | |
| 2016/0036964 A1* | 2/2016 | Barfield, Jr. ............ | H04W 4/40 455/418 |
| 2016/0240084 A1* | 8/2016 | Takeuchi ................ | B60T 17/22 |

FOREIGN PATENT DOCUMENTS

| JP | S63-27779 A | | 2/1988 |
| JP | 2002221573 A | * | 8/2002 |

(Continued)

*Primary Examiner* — Isam A Alsomiri
*Assistant Examiner* — Abdallah Abulaban
(74) *Attorney, Agent, or Firm* — Maschoff Brennan (57) ABSTRACT

An object detection device is applied to an object detection system which includes an object detection sensor installed in a vehicle so as to be oriented outward to detect an object around the vehicle. The object detection device includes: an error-handling control section that notifies a user of a detection error, if any, occurring in the object detection sensor, and brings the object detection system into an error-handling state; an action determination section that determines whether an error correction action has been performed by a user to correct the detection error, under conditions where the user has been notified of the detection error occurring in the object detection sensor; and a cancellation control section that relaxes predetermined cancellation conditions for cancelling the error-handling state when the error correction action is determined to have been performed, compared to when not performed.

14 Claims, 3 Drawing Sheets

(51) Int. Cl.
  *G08G 1/16* (2006.01)
  *B60N 2/00* (2006.01)
  *G01S 7/52* (2006.01)
  *G01S 7/56* (2006.01)
  *G01S 15/08* (2006.01)

(52) U.S. Cl.
  CPC .............. *G01S 15/08* (2013.01); *G01S 15/93* (2013.01); *G08G 1/16* (2013.01); *G01S 2007/52009* (2013.01)

(56) References Cited

FOREIGN PATENT DOCUMENTS

| | | | | | |
|---|---|---|---|---|---|
| JP | 2011-215002 | A | | 10/2011 | |
| JP | 2014-089073 | A | | 5/2014 | |
| JP | 2016151828 | A | * | 8/2016 | .............. B60T 17/22 |
| WO | WO-2014125810 | A1 | * | 8/2014 | .............. G08G 1/168 |
| WO | WO-2015118804 | A1 | * | 8/2015 | .............. G08G 1/166 |

* cited by examiner

OBJECT DETECTION DEVICE

CROSS-REFERENCE TO RELATED APPLICATION

The present application is a national stage application of PCT Application No. PCT/JP2017/030431, filed on Aug. 24, 2017, which is claims the benefit of priority from earlier Japanese Patent Application No. 2016-172107 filed Sep. 2, 2016, the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an object detection device that detects an object around the vehicle.

BACKGROUND ART

Several object detection systems for vehicles have been implemented. For example, such a system includes a range sensor, such as an ultrasonic sensor, installed in the vehicle to detect a preceding vehicle, a pedestrian, or an object, such as an obstacle, around the vehicle. It is proposed that such a system is used for performing various kinds of control over the vehicle to improve driving safety.

Ultrasonic sensors in general are externally provided to vehicles and thus are easily affected by the changes of external environments. Therefore, such an externally provided ultrasonic sensor may temporarily suffer a detection error, for example, due to snow, mud, or other matter that has adhered to the sensor during traveling. In such a case, a measure for handling the error is taken, such as disabling the object detection system (e.g., PTL 1).

CITATION LIST

Patent Literature

PTL 1: JP 2011-215002 A

SUMMARY OF THE INVENTION

When an object detection system that has been disabled is restored to a normal state, some time is taken for confirming the normal operation of the system. Disadvantageously, however, object detection systems are not always restored soon, despite the ultrasonic sensor having already been restored to a normal state. Specifically, if a detection error occurs in an ultrasonic sensor, the user may remove the cause, such as snow, of the detection error. Despite the removal of the cause, however, some time may be taken for the object detection system to be restored to a normal state, and this is disadvantageous for performing object detection.

If the object detection system is provided with an error lamp for displaying the occurrence of a detection error in the ultrasonic sensor, quite a long time may be taken for the error lamp to be extinguished after the user's removal of the cause, such as snow, with the result that the user may again attempt to remove the cause. This may produce a great deal of inconvenience to the user.

The present disclosure has been made in light of the issues set forth above, and aims to provide an object detection device which is capable of appropriately detecting an object by using an object detection sensor.

The present disclosure is applied to an object detection system which includes an object detection sensor that is installed in a vehicle so as to be oriented outward to detect an object around the vehicle, and includes: an error-handling control section that notifies a user of a detection error, if any, occurring in the object detection sensor, and brings the object detection system into an error-handling state; an action determination section that determines whether an error correction action has been performed by a user to correct the detection error, under conditions where the user has been notified of the detection error occurring in the object detection sensor; and a cancellation control section that relaxes predetermined cancellation conditions for cancelling the error-handling state when the error correction action is determined to have been performed, compared to when not performed.

If snow or other matter adheres to an object detection sensor, error handling may be executed to disable the object detection system that uses the object detection sensor. In such a case, it is desirable that the user notices the detection error of the object detection sensor, and removes the cause of the error, followed by cancelling the error-handling state of the system at an earlier stage.

In this regard, in the configuration set forth above, it is determined whether the user has performed an error correction action under conditions where the user has been notified of the detection error of the ultrasonic sensor. If the error correction action is determined to have been performed, cancellation conditions for error-handling state of the object detection system is ensured to be relaxed, compared to the case where the action has not been performed. In this case, the error-handling state is easily cancelled when the cause of the error in the object detection sensor is eliminated, unlike the case where the error-handling state of the system is cancelled, regardless of an error correction action being performed or not. Consequently, the time taken for cancelling the error-handling state of the object detection system is shortened. Thus, object detection can be appropriately performed using an object detection sensor.

BRIEF DESCRIPTION OF THE DRAWINGS

The aim set forth above and other aims, or characteristics or advantageous effects of the present disclosure will be clarified more through the specific description given below referring to the accompanying drawings. In the drawings.

DESCRIPTION OF THE EMBODIMENTS

With reference to the drawings, an embodiment of the present disclosure will be described. The present embodiment embodies an object detection system installed in a vehicle. This system includes an object detection device (termed ECU hereinafter), and detects an object (e.g. another vehicle, a road structure, etc.) around the vehicle.

Figure 1:
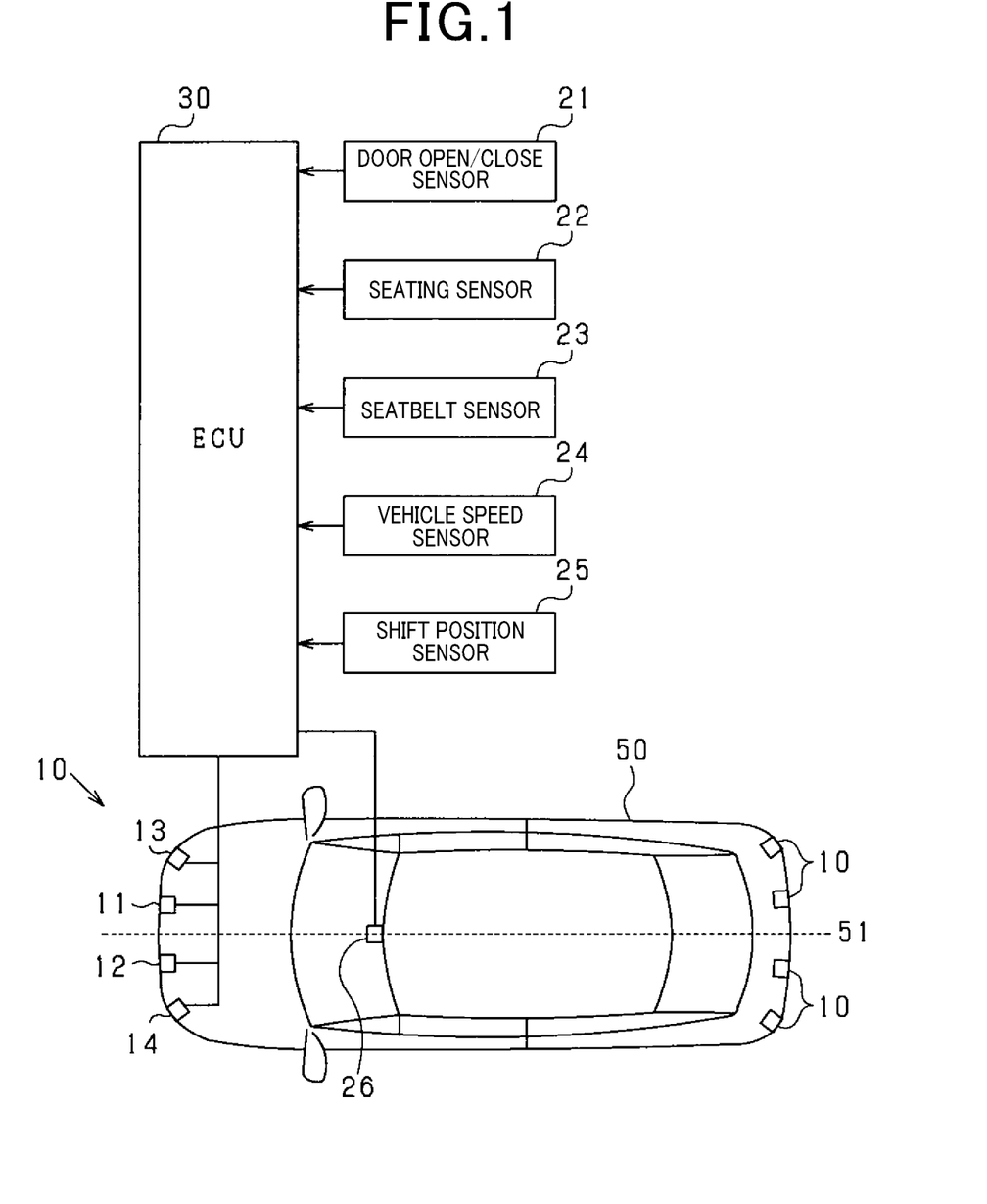
FIG. 1 is a schematic diagram illustrating a configuration of an object detection system for vehicles.

Referring first to FIG. 1, a description will be given of a schematic configuration of the object detection system for vehicles, according to the present embodiment. As shown, a vehicle 50 mainly includes an ultrasonic sensor 10 as a range sensor, various detectors 20, and an ECU 30. The detectors 20 include a door open/close sensor 21, a seating sensor 22, a seatbelt sensor 23, a vehicle speed sensor 24, a shift position sensor 25, a camera sensor 26, and the like.

The ultrasonic sensor cyclically 10 transmits ultrasonic waves as search waves and receives waves reflected from an object. The travel time of the waves from transmission to reception is used as a basis for acquiring distance information of an object around the vehicle 50. The acquired distance information is inputted to the ECU 30.

In the present embodiment, the vehicle 50 has front and rear bumpers each of which is provided with 4 sensors that are mounted at predetermined intervals along the width direction of the vehicle. For example, the front bumper is provided with two center sensors, i.e. a first sensor 11 and a second sensor 12, in the vicinity of a center line 51 with respect to the width direction of the vehicle. These sensors 11 and 12 each serve as the ultrasonic sensor 10 and are located so as to be asymmetric about the center line 51. The front bumper is also provided with two corner sensors 13 and 14 respectively provided to the right and left corners of the vehicle 50.

The door open/close sensor 21, which is one of the various detectors 20, detects open/close of a door, such as the driver door or the passenger seat door. The seating sensor 22 is configured, for example, by a known pressure sensor or other sensor, to detect a pressure applied to the seat. The seatbelt sensor 23 serves as an encoder that detects a tension of the seatbelt, or specifically, detects the rotation angle of the motor that unwinds or takes up the seatbelt.

The vehicle sensor 24 is mounted, for example, to a wheel to detect the speed of the vehicle 50, based on the rotational speed of the wheel. The shift position sensor 25 detects a shifted position of the transmission.

The camera sensor is configured, for example, by a monocular or stereo camera, such as a CCD camera, a CMOS image sensor, or a near-infrared camera. The camera sensor 26 is mounted to the front of the vehicle 50 so as to be located at a predetermined level at the center with respect to the width direction of the vehicle. The camera sensor 26 captures a bird's eye view image of an area extending ahead of the vehicle in a predetermined angular range. The detections performed by the various detectors 20 are inputted to the ECU 30.

The ECU 30 is mainly configured by a computer that includes a CPU, various memories, and other components. The ECU 30 determines the presence of an object around the vehicle 50, performs a contact avoidance process for the object, or other processes, based on the distance information of the object (detected distance to the object) outputted from the ultrasonic sensor 10. The contact avoidance process includes operating a warning device for giving a notification to the user, or the driver, or operating the braking device.

The present embodiment assumes a situation where a detection error has temporarily occurred in the ultrasonic sensor 10. Specifically, the present embodiment assumes a detection error due to snow, mud, or other matter adhering to portions of the ultrasonic sensor 10 exposed outside the vehicle 50. In this case, the ECU 30 determines whether a detection error has occurred in the ultrasonic sensor 10, based on the output of the ultrasonic sensor 10. It should be noted that a known method may be used for determining a detection error in this case.

Specifically, the ECU 30 uses distance information outputted from the ultrasonic sensor 10 for the determination. For example, based on the distance information outputted from the ultrasonic sensor 10, the ECU 30 determines the occurrence of a detection error if an object is consecutively detected in a close range (e.g., 50 cm or less) a predetermined number of times, i.e. if the sensor output consecutively indicates an error a predetermined number of times, during traveling of the vehicle 50. Specifically, in this case, an object is consecutively detected at close range despite the vehicle 50 being traveling, and therefore the ECU 30 determines adhesion of snow, mud, or other matter.

It should be noted that, in this case, the detection error of the ultrasonic sensor 10 may be determined based on the reflected wave reverberation, instead of the distance information. For example, if the reflected wave reverberation has exceeded a predetermined threshold, it may be determined that a detection error has occurred in the ultrasonic sensor 10.

If a detection error is determined to have occurred, the ECU 30 informs the user accordingly and brings the object detection system into an error-handling state. In this case, with the system being brought into an error-handling state, and while the ultrasonic sensor 10 acquires distance information of the object, the object detection signal based on the distance information is no longer outputted to the warning device or the braking device. In other words, the system is brought into a state where no contact avoidance process is executed based on the object detection that uses the ultrasonic sensor 10. This prevents unwanted operation of the warning device, the braking device, or other device, which would otherwise have been operated due to the erroneous detection of the ultrasonic sensor 10. Methods of notifying the user of the detection error include, but are not limited to, a method using a buzzer, a method of flashing a lamp, and other methods.

If the object detection system has once been brought into an error-handling state, some time is required for the system to be restored to the normal state. In this case, the normal operation is confirmed so that the unwanted operation would not be performed due to possible erroneous restoration of the system to the normal state. Specifically, predetermined cancellation conditions are preset for cancelling the error-handling state of the system.

If the user is notified of the occurrence of a detection error in the ultrasonic sensor 10, the user may remove the cause, such as snow. The removal of the cause of the detection error may lead to restoration of the ultrasonic sensor 10 to the normal state. However, the time taken for the object detection system to be restored to the normal state may be long, despite the cause being removed, and this is considered to be disadvantageous when performing object detection.

In this regard, in the present embodiment, it is determined whether the user has performed an error correction action under conditions where the user has been notified of the detection error of the ultrasonic sensor 10. If an error correction action is determined to have been performed, the ECU 30 is ensured to relax the cancellation conditions for error-handling state of the object detection system, compared to when the action is not performed. In this case, if an error correction action is determined to have been performed, the cancellation conditions are relaxed so that the error-handling state of the object detection system is easily cancelled. In other words, the object detection system is easily restored to the normal state at an earlier stage.

A more specific description will be given of relaxing the cancellation conditions for the error-handling state of the object detection system. The present embodiment is configured to cancel the error-handling state of the object detection system if the following conditions are satisfied when distance information is outputted from the ultrasonic sensor 10. The conditions are that a detected distance D to the object, i.e. the distance information, is within a normal range (e.g., not less than a threshold $D^{th}$), and the normal-range detected distance D has been consecutively acquired as a criterion count $N^{th}$. In this configuration, the ECU 30 decrements at least either of the threshold $D^{th}$ and the criterion count $N^{th}$, so that the cancellation conditions are relaxed. The threshold $D^{th}$ before being decremented serves as a criterion for determining that the distance to the object is a close range, and thus is set, for example, to 50 cm.

In the present embodiment, the ECU 30 determines whether an error correction action has been performed. The error correction action refers to the user's behavior of correcting the detection error of the ultrasonic sensor 10. For example, the error correction action corresponds to the user's direct behavior of removing snow that has adhered to the ultrasonic sensor 10. However, it is difficult to directly detect such a behavior using a sensor, or the like. Therefore, the present embodiment uses a specific user's behavior as a basis for determining exhibition of an error correction action.

Specifically, the ECU 30 determines the user's exit of the vehicle and entry of the vehicle again as an error correction action. Specifically, if the user exits the vehicle and enters the vehicle again under conditions where the user has been notified of a detection error of the ultrasonic sensor 10, the ECU 30 determines that an error correction action has been performed. It should be noted that the user's exit of the vehicle and entry of the vehicle again can be determined by a known method. For example, the user's exit of the vehicle and entry of the vehicle again may be determined based on the output of the open/close sensor 21, the seating sensor 22, the seatbelt sensor 23, the shift position sensor 25, or other sensors.

If the snow or other matter has been removed, there may be a change in the output of the ultrasonic sensor 10, as the ultrasonic sensor 10 is restored to the normal state from the snow-adhering state. In this regard, the occurrence of change in the output of the ultrasonic sensor 10 is also ensured to be used as a basis for determining an error correction action.

Referring now to the flow diagram of FIG. 2, a description will be given of a cancellation process for error-handling state of the object detection system. This cancellation process is cyclically iterated by the ECU 30. The process herein is assumed to be performed in a state where the object detection system has gone into an error-handling state as a result of the ultrasonic sensor 10 causing a detection error due to adhesion of snow or other matter, i.e. a state where the system has been disabled.

First, at step S11, the ECU 30 determines whether the object detection system is in an error-handling state. If the determination is NO at step S11, control proceeds to step S12. At step S12, it is determined whether a detection error has occurred in the ultrasonic sensor 10, based on the output of the ultrasonic sensor 10. For example, if the detected distance D outputted from the ultrasonic sensor 10 consecutively indicates close range (e.g., 50 cm or less) a predetermined number of times, it is determined that a detection error has occurred (YES at step S12). In this case, the object detection system is determined to be in an error-handling state, and the user is notified that a detection error has occurred in the ultrasonic sensor (step S13). In this error-handling state, the contact avoidance process based on the object detection of the ultrasonic sensor 10 is stopped. If the determination is NO at step S12, the present process is directly terminated. It should be noted that step S13 corresponds to the error-handling control section.

If the object detection system is determined to be in an error-handling state (YES at step S11), control proceeds to step S14 where the ECU 30 performs an error correction action determination process. FIG. 3 shows a flow diagram of the error correction action determination process. At step S31, it is determined whether the flag indicating exhibition of an error correction action is in an off state. If the determination is YES at step S31, control proceeds to step S32, and if NO, returns to step S15 of FIG. 2.

At step S32, it is determined whether the user has exited the vehicle. Specifically, the ECU 30 determines whether the user has exited the vehicle, based on the output of the door open/close sensor 21 or the seating sensor 22, and whether a predetermined time (e.g., 3 minutes) has not yet elapsed from the user's exit of the vehicle. For example, if the driver door is opened, and the state of the driver's seat has changed from seated to unseated, the driver may be regarded as having exited the vehicle. The driver exit determination may be made by also considering the output of the seatbelt sensor 23 or the shift position sensor 25. If the determination at step S32 is YES, control proceeds to step S33.

At step S33, it is determined whether the user has entered the vehicle again. If the user enters the vehicle again within a predetermined time after the user's exit of the vehicle, i.e. if the user's exit of the vehicle is only temporary, there is a high probability that an error correction action, such as a removal work, has been performed. As in the driver exit determination, the user's entry of the vehicle again is determined herein based on the output of the door open/close sensor 21 or the seating sensor 22. For example, if the state of the driver seat changes from unseated to seated, and if the driver door is closed, it may be determined that the driver has entered the vehicle again. In this case as well, the driver entry determination may be made considering the output of the seatbelt sensor 23 or the shift position sensor 25. If the determination at step S33 is YES, control proceeds to step S34.

At step S34, the ECU 30 determines whether there is a change in the output of the ultrasonic sensor 10. The determination herein is made based on a detected distance D1 outputted from the ultrasonic sensor 10 before the driver's exit of the vehicle, and a detected distance D2 outputted after the driver's entry of the vehicle again. Specifically, if the detected distance D2 becomes equal to or greater than the detected distance D1, it is determined that there is a change in the output. Change in the output may be determined to have occurred if the detected distance D that has been smaller than the threshold $D^{th}$ before the driver's exit of the vehicle exceeds the threshold $D^{th}$ after the driver's entry of the vehicle again. If the determination at step S34 is YES, control proceeds to step S35. At step S35, the action flag is turned on, and then control returns to step S15 of FIG. 2. If the determination is NO at step S32, S33 or S34, the off state of the action flag is maintained, and control returns to step S15 of FIG. 2.

Figure 2:
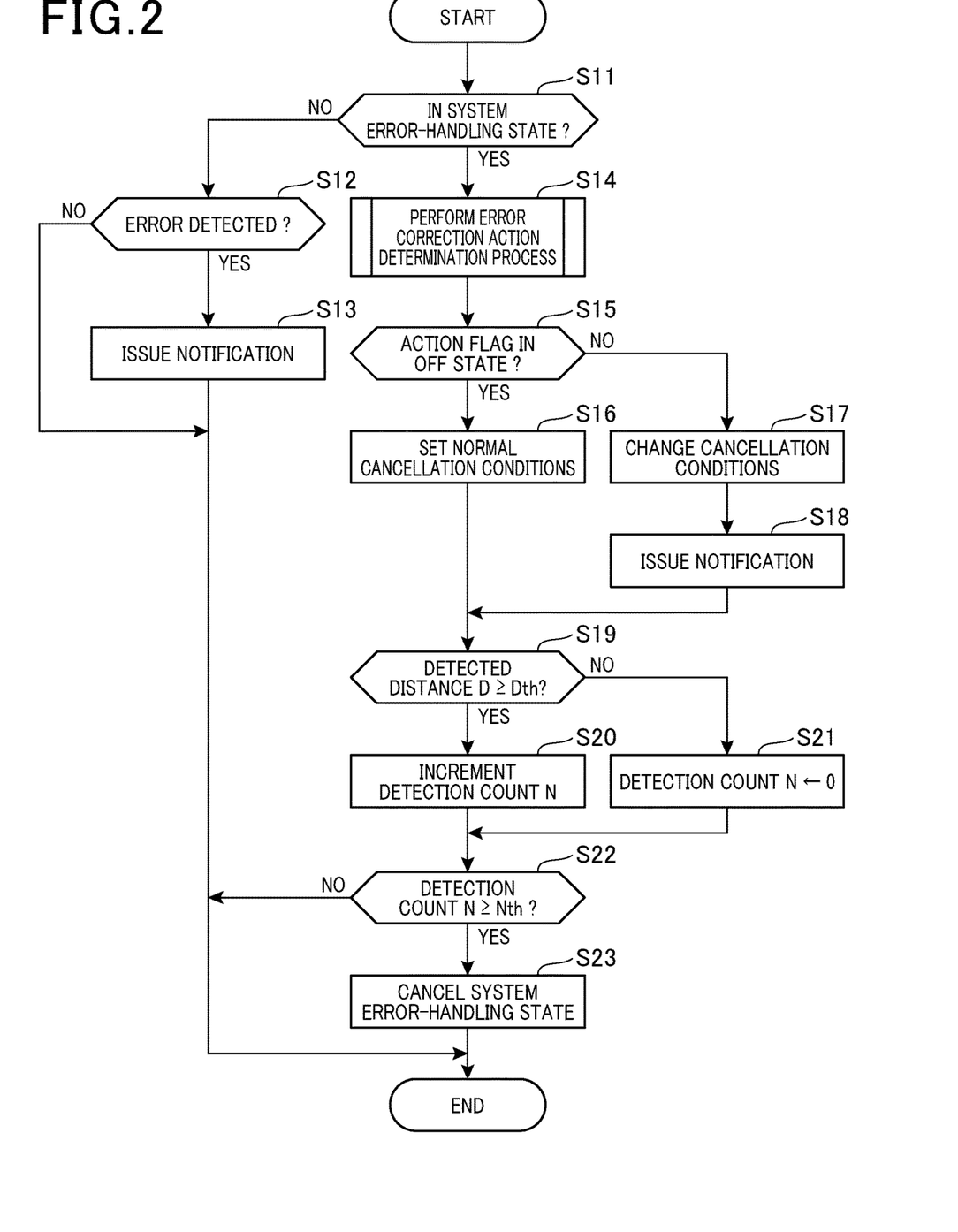
FIG. 2 is a flow diagram illustrating steps of a cancellation process for error-handling state of the system.
Figure 3:
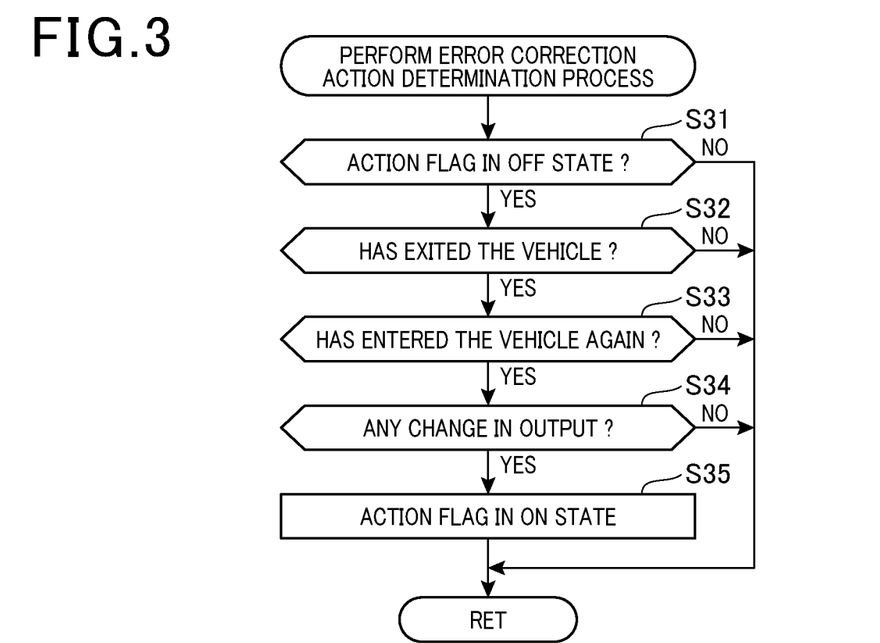
FIG. 3 is a flow diagram illustrating steps of an error correction action determination process.

At step S15 of FIG. 2, it is determined whether the action flag is in an off state. If the determination at step S15 is YES, i.e. if no error correction action has been performed, control proceeds to step S16. It should be noted that steps S14 and S15 correspond to the action determination section.

At step S16, normal cancellation conditions are set without making any change. In other words, the ECU 30 uses the threshold $D^{th}$ and the criterion count $N^{th}$ that are set as normal cancellation conditions. In this case, the subsequent processing at steps S19 to S23 is performed based on the normal cancellation conditions.

If the determination at step S15 is NO, i.e. if an error correction action has been performed, control proceeds to step S17 where the ECU 30 relaxes the cancellation conditions. Specifically, the ECU 30 decrements the threshold $D^{th}$ and the criterion count $N^{th}$ that are set as normal cancellation conditions. At this step, both of the threshold $D^{th}$ and the criterion count $N^{th}$ are decremented. Thus, if an error correction action is performed, the cancellation conditions are relaxed, compared to when not performed.

If the cancellation conditions are changed at step S17, the changed cancellation conditions are maintained for a predetermined time T. In this case, the changed cancellation conditions are maintained for the predetermined time T, regardless of the detection state of the ultrasonic sensor 10, until the detection count N reaches the criterion count $N^{th}$. For example, a normal output may not be consecutively acquired, despite an error correction action being performed. In this case, there is a disadvantage that the temporal output change may cause the changed cancellation conditions to be immediately restored to the initial cancellation conditions. To cope with this, the changed cancellation conditions are maintained for a predetermined time T to mitigate such a disadvantage. The predetermined time T is set, for example, to about 30 seconds to 60 seconds. It should be noted that step S17 corresponds to the cancellation control section.

At the subsequent step S18, the ECU 30 causes a display device or other component to notify the user that the cancellation process for the object detection system is performed in response to the error correction action performed. Thus, the user can ascertain that the cancellation process for the object detection system is being executed based on the error correction action. It should be noted that step S18 corresponds to the notification section.

The following description deals with processing at step S19 onward involved in a process which is executed when the cancellation conditions are changed.

At step S19, it is determined whether the output of the ultrasonic sensor 10 is within a predetermined normal range. At this step, the ECU 30 determines, for example, whether the detected distance D outputted from the ultrasonic sensor 10 is not less than a changed threshold $D^{th}$. If the determination at step 19 is YES, control proceeds to step S20 where the detection count N is incremented. If the determination at step 19 is NO, control proceeds to step S21 where the detection count N is reset. At step S22, it is determined whether the detection count N is not less than the changed criterion count $N^{th}$. If the determination at step S22 is YES, control proceeds to step S23 where the error-handling state of the object detection system is cancelled. If the determination at step S22 is NO, the present process is directly terminated.

Figure 4:
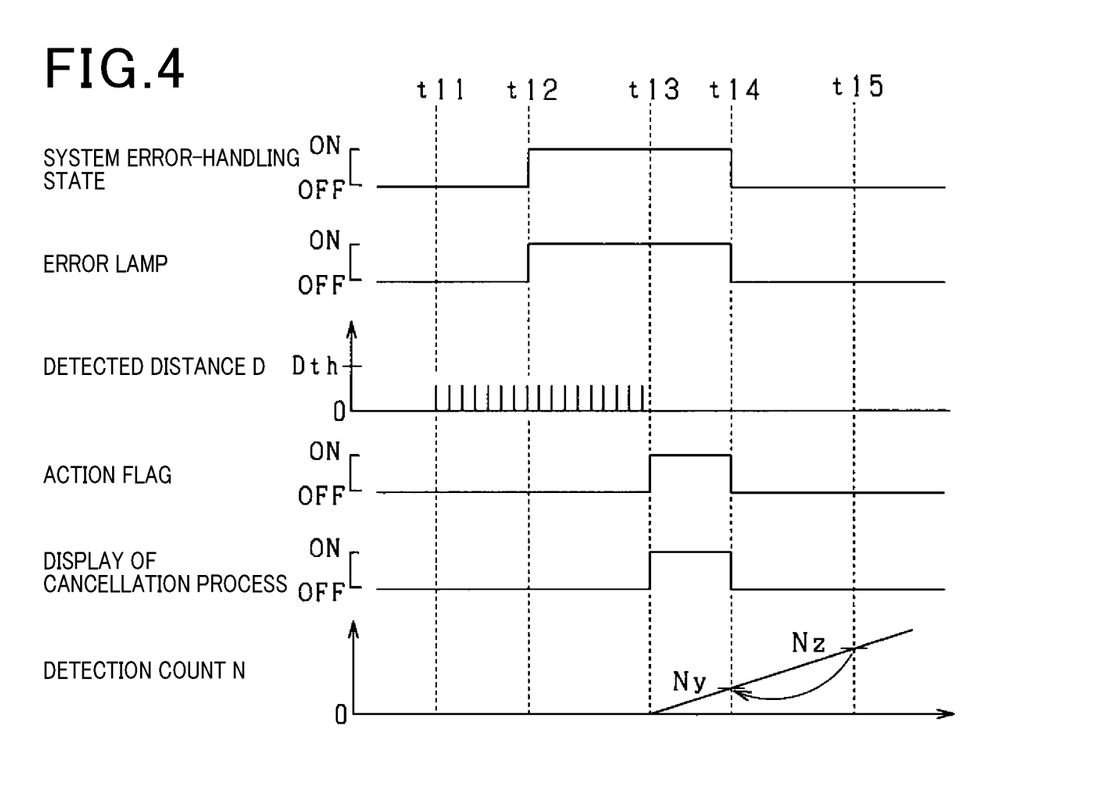
FIG. 4 is a timing diagram illustrating a mode of a cancellation process for error-handling state of the system.

FIG. 4 shows a timing diagram more specifically indicating the process shown in FIG. 2. In FIG. 4, the ultrasonic sensor 10 is in a normal state. Due to adhesion of snow or other matter to the ultrasonic sensor 10, from time t11, a detected distance D indicating a close range is outputted from the ultrasonic sensor 10. Then, at time t12, when consecutive output of the detected distance D indicating a close range reaches a predetermined count Nx, the object detection system is brought into an error-handling state. In this case, the error lamp is flashed to notify the user of the occurrence of a detection error.

After that, when an error correction action, such as a removal work, is performed by the user, an action flag is turned on at time t13. With the action flag being turned on, the cancellation conditions are relaxed. In FIG. 4, the criterion count $N^{th}$ for the detection count N is changed from Nz to Ny. In this case, the cancellation process being executed is displayed based on the error correction action. Then, the detection count N is incremented based on the detected distance D of the ultrasonic sensor 10 being within the predetermined normal range. Then, when the detection count N reaches Ny at time t14, the error-handling state of the object detection system is cancelled. If the cancellation conditions are not changed, the error-handling state of the object detection system is cancelled at time t15 when the detection count N reaches Nz.

Thus, with the criterion count $N^{th}$ for the detection count N being changed from Nz to Ny, the time taken for the cancellation conditions to be established is shortened. In other words, the object detection system is restored to the normal state at an earlier stage.

According to the embodiment described above, the following advantageous effects are obtained.

With the above configuration, whether the user has performed an error correction action is determined under conditions that there is a notification of the ultrasonic sensor 10 causing a detection error. If an error correction action is determined to have been performed, the cancellation conditions for error-handling state of the object detection system are ensured to be relaxed, compared to the case where such an action is not performed. In this case, unlike the case where the error-handling state is cancelled irrespective of an error correction action being performed or not, the error-handling state is easily cancelled when the cause of the error of the ultrasonic sensor 10 is eliminated. Consequently, the time taken for cancelling the error-handling state of the object detection system is shortened. Thus, object detection is appropriately performed using the ultrasonic sensor 10.

Specifically, the detection count N of the normal output of the ultrasonic sensor 10, which is included in the cancellation conditions, is ensured to be decremented. In this case, since a small detection count N only has to be reached to establish the cancellation conditions, the time taken for establishing the cancellation conditions can be shortened. Thus, the object detection system can be restored to the normal state at an earlier stage.

Furthermore, the cancellation conditions that have been relaxed are ensured to be maintained for a predetermined period, irrespective of the detection state of the ultrasonic sensor 10. Thus, after an error correction action is determined to have been performed, the determination is prevented from being cancelled such as by the temporal change in the output of the ultrasonic sensor 10, and the changed cancellation conditions are prevented from being restored to the initial cancellation conditions.

If the user exits the vehicle and again enters the vehicle under conditions where the user is notified of a detection error as having occurred in the ultrasonic sensor 10, there is a high probability that an error correction action being performed by the user. Considering this, the user's exit of the vehicle and entry of the vehicle again are used as a basis for determining an error correction action being performed. Thus, the degree of certainty is enhanced when determining an error correction action, and this leads to enabling appropriate cancellation of the error-handling state.

Furthermore, if there is a change in the output of the ultrasonic sensor 10 under conditions where the user is informed of a detection error occurring in the ultrasonic sensor 10, there is a high probability that an error correction action is being performed by the user. Considering this, the occurrence of output change of the ultrasonic sensor 10 is ensured to be also used as a basis for determining an error correction action. Thus, the degree of certainty is enhanced when determining an error correction action, and this leads to enabling appropriate cancellation of the error-handling state.

If an error correction action is performed, the user is informed that the cancellation process for error-handling state of the object detection system is being executed in response to the error correction action. Thus, the user can ascertain that the cancellation process for error-handling state is being executed based on the error correction action, i.e. that the system will be restored to the normal state at an earlier stage. In this way, usability for the user is improved.

The embodiment described above may be modified, for example, as follows.

In the embodiment described above, the user's exit of the vehicle and entry of the vehicle again are ensured to be determined as being an error correction action. In place of this configuration, either the user's exit of the vehicle or entry of the vehicle may be ensured to be determined as being an error correction action. Specifically, if the user exits the vehicle or enters the vehicle under conditions where the user has been informed of a detection error occurring in the ultrasonic sensor 10, there is a high probability that an error correction action is being performed by the user.

Besides the above determination method, other determination methods may be used. Specifically, a potential error correction action may be determined based on the output of the vehicle speed sensor 24 and the camera sensor 26. For example, a potential error correction action may be determined if a person is detected around the ultrasonic sensor 10 by the camera sensor 26 when the vehicle speed is zero.

Furthermore, a predetermined value may be set in advance as a criterion for determining the output of the ultrasonic sensor 10 at the time the user has removed snow, or other matter, so that an error correction action can be determined as having been performed based on the predetermined value.

Alternatively, the vehicle 50 may be provided with a button for indicating exhibition of an error correction action, so that the user's depression of the button can be used as a basis for determining exhibition of an error correction action.

The embodiment described above is so configured that an error correction action is determined based on the user's exit of the vehicle and entry of the vehicle again, and that, then, the output change of the ultrasonic sensor 10 is determined. However, configuration should not be limited to this. Exhibition of an error correction action may be ensured to be determined only based on the user's exit of the vehicle and entry of the vehicle again, or only based on the output change.

For example, the ultrasonic sensor 10 may be provided with a removal means, such as a wiper, for removing snow, or other matter that has adhered thereto. With this configuration, the user can remove the snow by a button operation without the need of exit of the vehicle. With this configuration as well, an error correction action can be determined.

In the embodiment described above, cancellation conditions for the error-handling state of the object detection system include acquisition of consecutive normal outputs of the ultrasonic sensor 10 as a criterion count $N^{th}$. However, this may be changed. For example, the cancellation conditions may be acquisition of consecutive normal outputs of the ultrasonic sensor 10 during a criterion time $T^{th}$. If an error correction action is determined to have been performed with this configuration, the criterion time $T^{th}$ may be decremented to relax the cancellation conditions. With this configuration as well, the time taken for cancelling the error-handling state of the object detection system can be shortened.

In the embodiment described above, the threshold $D^{th}$ and the criterion count $N^{th}$ are ensured to be changed to predetermined values if an error correction action is determined to have been performed. However, configuration should not be limited to this. These values to be changed (changed values) may be variably set. For example, the degree of certainty when determining an error correction action may be calculated, and an amount of change of a threshold may be determined according to the degree of certainty. In this case, for example, a larger degree of certainty of determination will result in a larger amount of change of a threshold. That is, as the amount of change becomes larger, the threshold is so changed that the cancellation conditions are more easily relaxed. The degree of certainty when determining an error correction action may be calculated based on a plurality of determinations including a determination of the driver's exit of the vehicle, a determination of the driver's entry of the vehicle again, a determination of output change, and other determinations.

In the embodiment described above, if the cancellation conditions are changed, the changed cancellation conditions are ensured to be maintained for a predetermined time T. However, in addition to or in place of this configuration, the number of times of resetting the detection count N may be ensured to have an upper limit, and the changed cancellation conditions may be maintained until the upper limit is reached. For example, with the former configuration, the changed cancellation conditions are maintained until lapse of the predetermined time T or until the number of times of resetting the detection count N reaches the upper limit, whichever is earlier. With these configurations as well, the the changed cancellation conditions are prevented from being immediately and disadvantageously restored to the initial cancellation conditions due to temporal output change, despite an error correction action having been performed.

In the embodiment described above, an ultrasonic sensor 10 that is a range sensor is used as an object detection sensor. However, configuration should not be limited to this. Besides the ultrasonic sensor 10, a range sensor, such as a radar sensor, or a camera sensor, may be used as an object detection sensor. Alternatively, an infrared sensor or the like may be used. For example, when using a radar sensor, it is true that the sensor is not exposed outside the vehicle 50. However, snow or other matter may adhere to the outer surface of the vehicle 50 in the direction of emitting radar, and may become the cause of a detection error as in the case of using the ultrasonic sensor 10.

The present disclosure has so far been described based on an embodiment. However, the present disclosure should not be construed as being limited to the embodiment or structure. The present disclosure should encompass various modifications, or modifications within the range of equivalence. In addition, various combinations and modes, as well as other combinations and modes, including those which include one or more additional elements, or those which include fewer elements should be considered to be in the scope and spirit of the present disclosure.

The invention claimed is:

1. An object detection device applied to an object detection system which includes an object detection sensor installed in a vehicle so as to be oriented outward to detect an object around the vehicle and a warning device so as to notify a user of a detection error of the object detection sensor, the device comprising:
  a memory;
  a processor communicable to the memory; and
  a set of computer-executable instructions stored on the memory that cause the processor to implement:
    detecting a detection distance to an object detected by the object detection sensor;
    determining whether the object is detected within a detection range located at a distance which is less than a distance threshold;
    in response to the object being detected within the detection range located at the distance which is less than the distance threshold, determining that a detection error of the object detection sensor has occurred, the detection error being caused by matter adhering onto portions of the object detection sensor or an outer surface of the vehicle;
    counting a consecutive number of times that an object is not detected within the detection range located at the distance which is less than the distance threshold after determining that the detection error of the object detection sensor has occurred;
    in response to the consecutive number of times being equal to or greater than a threshold number of times, determining that the occurred detection error of the object detection sensor has been released;
    in response to determining that the detection error of the object detection sensor has occurred, instructing the warning device to notify the user of the detection error of the object detection sensor, and bringing the object detection system into an error-handling state;
    determining whether the user has performed an error correction action to correct the detection error of the object detection sensor;
    in response to determining that the user has performed the error correction action, changing cancellation conditions for cancelling the error-handling state of the object detection system by changing at least one of the distance threshold and the threshold number of times; and
    canceling the error-handling state of the object detection system based on the changed cancellation conditions.

2. The object detection device according to claim 1, wherein:
  prior to changing of the cancellation conditions, canceling of the error-handling state of the object detection system based on the cancellation conditions comprises determining whether the detection distance to the object detected by the object detection sensor is less than the distance threshold for the threshold number of times.

3. The object detection device according to claim 1, wherein set of computer-executable instructions further cause the processor to implement:
  maintaining the changed cancellation conditions for a predetermined period in response to changing the cancellation conditions, irrespective of a detection state of the object detection sensor; and
  maintaining the changed cancellation conditions irrespective of whether the error correction action is determined to be performed within the predetermined period.

4. The object detection device according to claim 1, wherein the set of computer-executable instructions further cause the processor to implement:
  determining whether the user has performed the error correction action comprises determining whether the user has exited and entered the vehicle.

5. The object detection device according to claim 1, wherein the set of computer-executable instructions further cause the processor to implement:
  determining whether the user has performed the error correction action comprises determining whether the detection distance to the object changes after the user has exited and entered the vehicle.

6. The object detection device according to claim 1, wherein the set of computer-executable instructions further cause the processor to implement instructing of the warning device to issue a notification to the user in response to determining that the error correction action has been performed, the notification being that a cancellation process for the error-handling state is being executed in response to the error correction action.

7. An object detection method applied to an object detection system which includes an object detection sensor installed in a vehicle so as to be oriented outward to detect objects around the vehicle and a warning device so as to notify a user of a detection error of the object detection sensor, the method comprising:
  detecting a detection distance to an object detected by the object detection sensor;
  determining whether the object is detected within a detection range located at a distance which is less than a distance threshold;
  in response to the object being detected within the detection range located at the distance which is less than the distance threshold, determining that a detection error of the object detection sensor has occurred, the detection error being caused by matter adhering onto portions of the object detection sensor or an outer surface of the vehicle;
  counting a consecutive number of times that an object is not detected within the detection range located at the distance which is less than the distance threshold after determining that the detection error of the object detection sensor has occurred;
  in response to the consecutive number of times being equal to or greater than a threshold number of times, determining that the occurred detection error of the object detection sensor has been released;
  in response to determining that the detection error of the object detection sensor has occurred, instructing the warning device to notify the user of the detection error of the object detection sensor, and bringing the object detection system into an error-handling state;
  determining whether the user has performed an error correction action to correct the detection error of the object detection sensor;
  in response to determining that the user has performed the error correction action, changing cancellation conditions for cancelling the error-handling state of the object detection system by changing at least one of the distance threshold and the threshold number of times; and
  canceling the error-handling state of the object detection system based on the changed cancellation conditions.

8. The object detection method according to claim 7, wherein:
  prior to changing of the cancellation conditions, canceling of the error-handling state of the object detection system based on the cancellation conditions comprises determining whether the detection distance to the object detected by the object detection sensor is less than the distance threshold for the threshold number of times.

9. The object detection method according to claim 7, further comprising:
maintaining the changed cancellation conditions for a predetermined period in response to changing the cancellation conditions, irrespective of a detection state of the object detection sensor; and
maintaining the changed cancellation conditions irrespective of whether the error correction action is determined to be performed within the predetermined period.

10. The object detection method according to claim 7, wherein
determining whether the user has performed the error correction action comprises determining whether the user has exited and entered the vehicle.

11. The object detection method according to claim 7, wherein
determining whether the user has performed the error correction action comprises determining whether the detection distance to the object changes after the user has exited and entered the vehicle.

12. The object detection method according to claim 7, further comprising
instructing the warning device to issue a notification to the user in response to determining that the error correction action has been performed, the notification being that a cancellation process for the error-handling state is being executed in response to the error correction action.

13. The object detection device according to claim 1, wherein
changing of the cancellation conditions for cancelling the error-handling state of the object detection system comprises decrementing at least one of the distance threshold and the threshold number of times.

14. The object detection method according to claim 7, wherein
changing of the cancellation conditions for cancelling the error-handling state of the object detection system comprises decrementing at least one of the distance threshold and the threshold number of times.

* * * * *